United States Patent
Fischer et al.

[11] 3,787,165
[45] Jan. 22, 1974

[54] SUPPORT DEVICE FOR A MOULDING PRESS

[76] Inventors: Stefan Fischer, Im Korresgarten 21; Rainer Fischer, Am Wildtor 2, both of Lohmar (Bez. Koln), Germany

[22] Filed: Sept. 30, 1968

[21] Appl. No.: 763,500

[30] Foreign Application Priority Data
Sept. 30, 1967 Germany.................. P 17 04 046.9

[52] U.S. Cl.................. 425/450, 100/231, 100/245
[51] Int. Cl............................................. B29c 3/00
[58] Field of Search.......... 18/30 LA, 30 LM, 16 M; 100/231, 232, 245, 264; 425/450

[56] References Cited
UNITED STATES PATENTS

| 529,254 | 11/1894 | Fink | 100/232 |
| 1,370,570 | 3/1921 | Webb | 100/232 X |
| 2,555,476 | 6/1951 | Du Bois et al. | 18/16 M X |
| 3,192,561 | 7/1965 | Archer et al. | 100/232 UX |
| 3,214,505 | 10/1965 | Pierkonski et al. | 18/16 M UX |

FOREIGN PATENTS OR APPLICATIONS

| 1,139,123 | 6/1957 | France | 100/231 |

*Primary Examiner*—J. Spencer Overholser
*Assistant Examiner*—Michael O. Sutton
*Attorney, Agent, or Firm*—Burton L. Lilling

[57] ABSTRACT

This invention relates to a support device for use in combination with a molding press, which support serves to contain the forces exerted by the clamping together of the molds affixed to the platens of such press.

10 Claims, 3 Drawing Figures

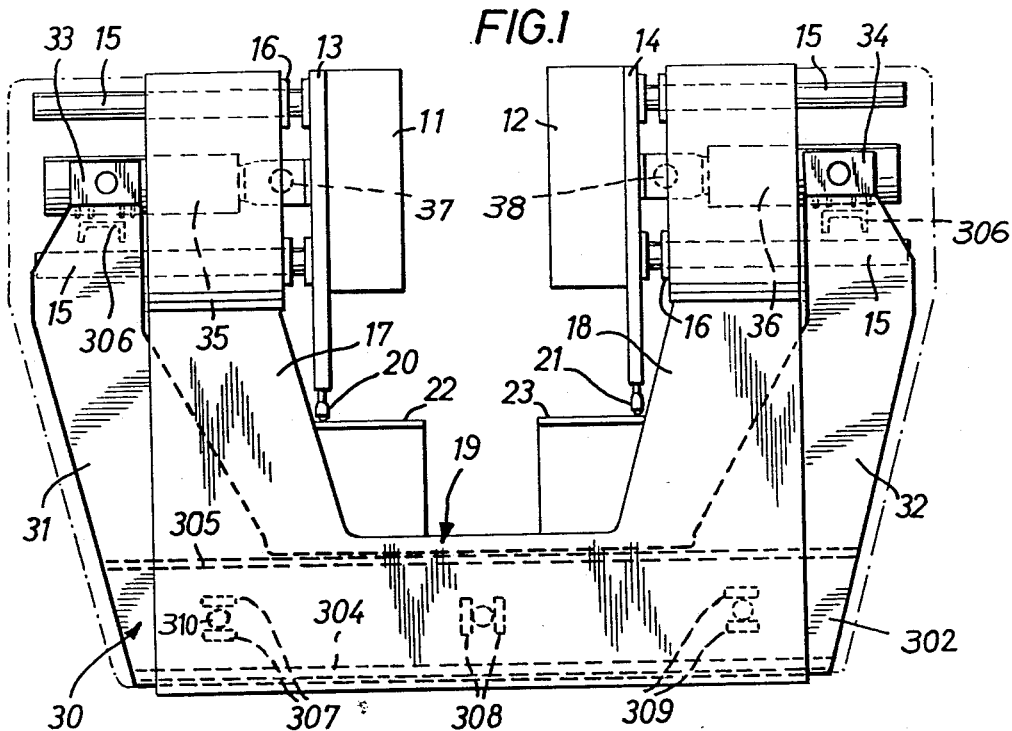
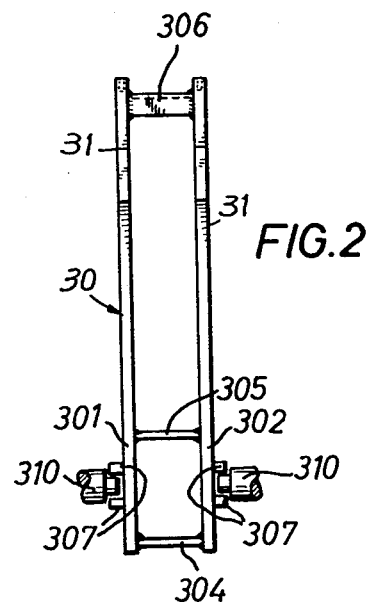
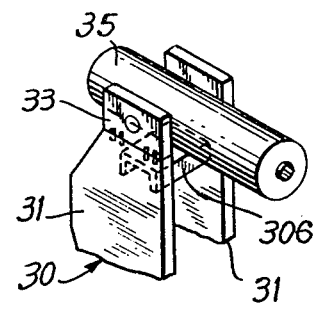

SUPPORT DEVICE FOR A MOULDING PRESS

BACKGROUND OF THE INVENTION

This invention concerns itself with an apparatus for the production of hollow articles from thermoplastic materials and especially hollow articles of relatively large dimensions, such as canisters and the like, where a parison or other preform is introduced between the open parts of a blow mold, which are affixed to opposing platens of a press, which are movable apart from and toward one another and displaceably guided by means of tie rods or bars and moved by hydraulic control devices.

In such apparatus the stand must not only carry and securely guide the mould parts, but also take up the counter-pressure caused by the closing pressure of the mould. Therefore, especially in apparatus for the production of large containers, extremely expensive stand constructions are necessary, since the counter-pressure must be absorbed without the stand being distorted to an unacceptable degree and the guidance of the mould parts and especially their alignment with one another being impaired. These difficulties and drawbacks are to be avoided by the invention.

SUMMARY OF THE INVENTION

For this purpose, in an apparatus of the stated kind, especially for the production of hollow articles of relatively large dimensions, such as canisters and the like, from thermoplastic synthetic plastics material with a blow mould which is carried by a stand and the parts of which are movable apart from and towards one another and displaceably guided in the stand for example by means of bars, and are moved by hydraulic control devices, the invention provides special support devices independent of the stand to take up the counter-pressure caused by the closing pressure of the mould. As a rule these support devices can even be made resiliently yieldable within certain limits. They can further be connected movably within certain limits with the stand, namely mainly in such manner that they retain a substantially stationary position in relation to the stand but are not rigidly connected with it.

In a preferred form of embodiment of an apparatus according to the invention, the support devices are made in the form of a U-shaped support which is arranged with its middle part in the foot of the stand and to the legs of which, which protrude outwards and upwards on both sides of the stand, are supported the stationary parts of the molding press articulated by the hydraulic control devices serving for the control of the mould movement.

By reason of such a configuration, the stand itself need not absorb the resulting closure pressure, and is relieved completely thereof, so that it needs to be made only just as strong as is necessary to achieve a secure guidance of the mould parts. However, the support device can also be made comparatively weak, since it can yield to a certain extent under the influence of the closure pressure, because this is of no importance to the secure guidance of the mould parts which are guided in the stand.

The invention permits the most manifold possible embodiments.

The invention will be explained in greater detail hereinafter by reference to a form of embodiment of an apparatus according to the invention which is represented somewhat diagrammatically by way of example, with the parts essential to understanding, in the accompanying drawing, wherein:

BRIEF DESCRIPTION OF THE DRAWING

FIG. 1 shows the apparatus in elevation, certain parts of the housing being indicated by broken lines.

FIG. 2 shows the support spring, seen from one end, and

FIG. 3 is a partial perspective view of the upper portion of the support device showing the manner of connection to the clamping cylinders of a press.

DESCRIPTION OF THE PREFERRED EMODIMENT

In the drawing, the apparatus as represented in FIG. 1 comprises the two mould halves 11 and 12 of the blow mould, which are carried by the mould-holding plates 13 and 14. A piece of tube or parison is brought in between the two mould halves in the opened condition in known manner, for example by extrusion from an extrusion head (not shown) of an extruder (likewise not shown) arranged above the blow mould, and after the closing of the mould halves the parison is blown up to form the finished hollow article, likewise in known manner. The mould-holding plates 13 and 14 are provided with guide bars 15 which are guided in guide bushings 16 in the upwardly extending parts 17 and 18 of the stand 19. The weight of the mould-holding plates 13 and 14 with the moulds 11 and 12 is taken up by support rollers 20 and 21 which run on tracks 22 and 23 of the stand in the opening and closing movements of the mould parts.

The foot of the stand 19 is made substantially hollow and accommodates the middle and lower part of a support 30, represented in somewhat thicker lines in FIG. 1, the two legs 31 and 32 of which protrude laterally out of the foot of the stand, while at the same time they extend upwards approximately to the level of the mould-holding plates 13 and 14 and their guide bars 15. As may be seen from FIG. 2, the support 30 is formed from two plates 301 and 302 of the form shown, which are rigidly interconnected by spacer members 304, 305, and 306. The support 30 is provided on its outer sides with pairs of retaining and guide strips 307, 308 and 309, between which there extend retaining pins, such as the retaining pins 310 in the case of the guide strip pairs 307 in FIG. 2, which are arranged in the foot of the stand and serve at the same time to align the middle part of the support in relation to the foot of the stand, in that they protrude inwardly from the wall. In this way the central guide strips 308 achieve a certain vertical mobility but prevent longitudinal shifting of the support in relation to the stand, while the guide strip pairs 307 and 309 permit a certain longitudinal displacement of the support at these points, as becomes necessary on deflection.

The upper ends of the legs 31 and 32 of the support 30 carry mounting brackets 33 and 34 which transmit the counter-pressure, that occurs upon closure of the mould halves 11 and 12, to the support 30 and at the same time provide an articulated connection of the clamping cylinders 35 and 36 to the support. The other end of the clamping unit, which may consist of a hydraulic cylinder with control piston and protruding piston rod, is articulatedly connected at 37 and 38, respectively, with the mould-holding plates 13 and 14. In this way, the whole closure pressure is absorbed by the support 30 and the stand 19 is relieved thereof, so that the latter needs to be made only as stout as is necessary for the guidance and retention of the mould parts.

We claim:

1. In a moulding press having means for molding parts, such as large containers, the combination comprising frame support means for supporting and guiding said means for molding parts, means for applying pressure to said means for molding parts, and secondary support means of limited resilient construction mounted for movement relative to said frame support means for resiliently absorbing reaction and counterpressures generated as a result of the closing pressures exerted against the means for molding parts, whereby said frame support means and said secondary support means function separately in that said frame support means need only be of such strength and construction to essentially support and guide said means for molding parts.

2. The combination according to claim 1, wherein said frame support means comprises a U-shape stand having a hollow interior portion and upwardly extending legs.

3. The combination according to claim 2, wherein said secondary support means is disposed within the hollow interior portion of said frame support means.

4. The combination according to claim 1, wherein said means for applying pressure to said means for molding parts is supported by said frame support means and the reaction and counterpressures generated are resiliently absorbed by said secondary support means.

5. The combination according to claim 2, wherein said secondary support means comprises a U-shape support having legs protruding outwardly and upwardly therefrom to opposite sides of said means for molding parts terminating at a point proximate said means for applying pressure to said means for molding parts.

6. The combination according to claim 5, wherein said secondary support means comprises at least two U-shaped plates in spaced relationship.

7. The combination according to claim 5, wherein said means for applying pressure to said means for molding parts comprise hydraulic cylinders mounted on said legs of said U-shaped support for movement therewith to absorb the reaction and counterpressures.

8. The combination according to claim 7, further including mounting brackets affixed to each of said legs of said U-shaped support, and said hydraulic cylinders are articulatedly mounted to and support by said mounting brackets.

9. The combination according to claim 5, further including at least one pair of horizontal retaining and guide strips affixed to said U-shaped support and a retaining pin moveable therebetween to restrict vertical movement of said U-shaped support, and at least a pair of vertical retaining and guide strips affixed to said U-shaped support and a second retaining pin moveable therebetween to restrict horizontal movement of said U-shaped support.

10. The combination according to claim 9, wherein said retaining pins are rigidly affixed to said U-shaped stand of said frame support means.

* * * * *